United States Patent
Zhao

(10) Patent No.: US 12,192,977 B2
(45) Date of Patent: *Jan. 7, 2025

(54) MANAGING WIRELESS DEVICE FREQUENCY BAND ASSIGNMENT

(71) Applicant: T-MOBILE INNOVATIONS LLC, Overland Park, KS (US)

(72) Inventor: Young Zhao, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,691

(22) Filed: Sep. 6, 2023

(65) Prior Publication Data

US 2023/0422228 A1 Dec. 28, 2023

Related U.S. Application Data

(63) Continuation of application No. 17/345,075, filed on Jun. 11, 2021, now Pat. No. 11,785,588.

(51) Int. Cl.
| | |
|---|---|
| *H04W 72/0453* | (2023.01) |
| *H04W 72/53* | (2023.01) |
| *H04W 72/563* | (2023.01) |
| *H04W 76/10* | (2018.01) |

(52) U.S. Cl.
CPC ....... *H04W 72/0453* (2013.01); *H04W 72/53* (2023.01); *H04W 72/563* (2023.01); *H04W 76/10* (2018.02)

(58) Field of Classification Search
CPC ............. H04W 72/0453; H04W 72/53; H04W 72/563; H04W 72/0457; H04W 76/10; H04W 76/15
USPC .................................................. 370/329–330
See application file for complete search history.

(56) References Cited

U.S. PATENT DOCUMENTS

| | | | |
|---|---|---|---|
| 7,218,644 B1 * | 5/2007 | Heinonen | H04W 8/04 370/468 |
| 10,856,317 B2 | 12/2020 | Ma et al. | |
| 10,945,274 B2 | 3/2021 | Zhang et al. | |
| 2012/0057478 A1 * | 3/2012 | Brannstrom | H04W 28/10 370/252 |
| 2013/0201916 A1 | 8/2013 | Kummetz et al. | |
| 2013/0208663 A1 * | 8/2013 | Kanniappan | H04L 69/24 370/329 |
| 2015/0055633 A1 * | 2/2015 | Wu | H04W 72/543 455/452.2 |
| 2015/0350955 A1 * | 12/2015 | Somasundaram | H04W 72/52 370/329 |
| 2017/0280507 A1 | 9/2017 | Wang | |
| 2018/0332465 A1 | 11/2018 | Lindoff et al. | |
| 2018/0367230 A1 | 12/2018 | Su et al. | |
| 2019/0075585 A1 | 3/2019 | Deogun et al. | |
| 2019/0200406 A1 | 6/2019 | Henttonen et al. | |

(Continued)

*Primary Examiner* — Candal Elpenord
(74) *Attorney, Agent, or Firm* — Jones Robb, PLLC

(57) ABSTRACT

Systems and methods provide for assignment of wireless devices to a frequency band for a particular RAT. The method may include determining corresponding bandwidths for each frequency band, calculating a ratio of each bandwidth to a total bandwidth, and ranking each band based on bandwidth. The method may further include assigning wireless devices to the frequency bands based on the rankings of each band and the caps imposed on each band.

20 Claims, 7 Drawing Sheets

(56) References Cited

U.S. PATENT DOCUMENTS

2020/0128601 A1  4/2020  Willars et al.
2021/0266753 A1  8/2021  Kumar
2022/0303975 A1  9/2022  Ma et al.
2022/0377804 A1  11/2022 Mann et al.

* cited by examiner

MANAGING WIRELESS DEVICE FREQUENCY BAND ASSIGNMENT

This patent application is a continuation of U.S. patent application Ser. No. 17/345,075, filed on Jun. 11, 2021, which is incorporated by reference in its entirety for all purposes.

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, Long Term Evolution (LTE), etc.), and 5G RATs (new radio (NR)). Deployment of the evolving RATs in a network provides numerous benefits. For example, newer RATs may provide additional resources to subscribers, faster communications speeds, and other advantages. However, newer technologies may also have limited range in comparison to existing technologies. To ensure consistent coverage through a wide geographic range, existing technologies such as 4G are often used in combination with newer technologies such as 5GNR.

When multiple RATs are used in combination, access nodes may utilize multiple channels having different frequency bands and/or transmission channels for deploying different RATs over a wireless air interface. Additionally, one access node transmitting over one channel may function as a master node having the capability to assign wireless devices to one of multiple secondary nodes transmitting over different channels and/or different RATs. The ability of the master node to assign wireless devices to secondary nodes can improve performance for the wireless devices.

In dual connectivity environment, mobile devices are able to connect to multiple RATs simultaneously. For example, wireless devices may connect to 4G LTE and 5G NR simultaneously. This configuration is known as E-UTRAN New Radio Dual Connectivity or EN-DC. While the transfer of data may be divided between LTE and NR, a 4G LTE evolved NodeB (eNB) may be in control of the dual-connectivity. When a mobile device wants to exchange data with the network it establishes a connection with the LTE network. If the eNB has an integrated next generation NodeB (gNB) and if the mobile device indicates support for EN-DC on a frequency band the gNB is operated on, the LTE eNB will instruct the mobile device to make measurements on the NR channel. If a signal is found, the eNB may then communicate to the gNB and give it all necessary parameters to establish a connection to the mobile device as well.

The EN-DC configuration is a generally static configuration in which one LTE carrier utilizes multiple NR bands, but cannot dynamically select bands. In other words, the selection of bands is fixed. Despite the existence of multiple NR Bands, an anchor LTE carrier assigns wireless devices to a single band or prioritized band unless the wireless device is outside of the coverage area of that band. If a wireless device has the capability to support all NR bands, it will be connected to the prioritized band unless it is out of the coverage area.

Thus, a large majority of wireless devices end up utilizing a single NR frequency band and other NR bands are left un-utilized. This configuration negatively impacts wireless device performance, particularly in dense or congested environments. A solution is needed that will fully utilize NR band capacity in order to enhance and maximize wireless device performance.

Overview

Exemplary embodiments described herein include systems, methods, and nodes for assigning wireless devices to a frequency band. An exemplary method for assigning a wireless device to one of multiple frequency bands operates in a dual connectivity environment deploying multiple bands for a first RAT. The method includes determining a corresponding bandwidth for each of multiple bands and determining a total bandwidth for the multiple bands deployed for the first RAT. The method additionally includes calculating a corresponding ratio for each band of each corresponding bandwidth to the total bandwidth for the multiple bands. The method further includes receiving a connection request at an access node from a wireless device for connection to the first RAT. The method further includes assigning the wireless device to one of the multiple bands based on the corresponding ratio.

In a further exemplary embodiment, an access node is provided that includes at least one processor programmed for performing multiple operations. The operations include determining a corresponding bandwidth for each of multiple bands for a first RAT, determining a total bandwidth for the first RAT and calculating a corresponding ratio for each band of each corresponding bandwidth to the total bandwidth for the first RAT. The operations further include receiving a connection request from a wireless device, wherein the connection request is for connection using the first RAT. The method further includes assigning the wireless device to one of the multiple bands of the first RAT based on the corresponding ratio.

In a further exemplary embodiment, a method includes determining a corresponding bandwidth for each of multiple bands for a first RAT. The method further includes determining a total bandwidth for the multiple bands deployed for the first RAT and calculating a corresponding ratio for each band of each corresponding bandwidth to the total bandwidth for the multiple bands. The method additionally includes ranking each band deployed for the first RAT based on the corresponding bandwidth and imposing a corresponding cap for wireless devices connecting to each band based on the corresponding ratio. The method further includes assigning wireless devices to a highest ranked band until the corresponding cap is reached. Embodiments of the method further include assigning wireless devices a next ranked band until a cap for the next ranked band is reached until all ranked bands reach the corresponding cap.

DETAILED DESCRIPTION

Figure 1:
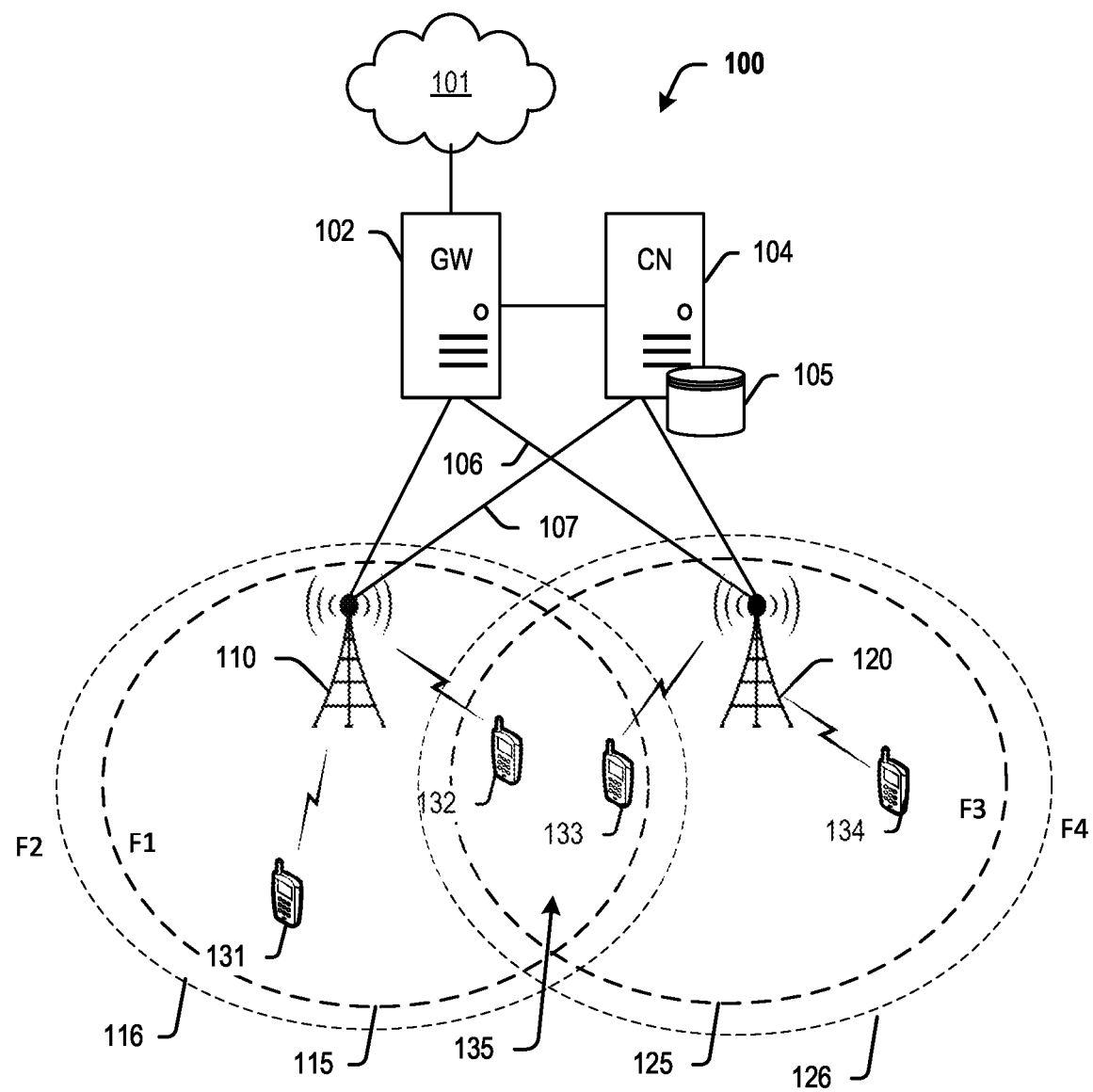
FIG. 1 depicts an exemplary system for wireless communication, in accordance with the disclosed embodiments.

Exemplary embodiments described herein include systems, methods, access nodes for assigning a wireless device to a frequency band, for example, in an EN-DC network based on the bandwidth of the available frequency bands. Thus, embodiments disclosed herein operate in networks utilizing an EN-DC architecture, which allows devices to access two different RATs, such as both LTE and 5G, simultaneously on the same channels or different channels encompassing various spectrum bands. Thus, a master node may assign a wireless device to a frequency band, e.g. an NR frequency band, selected from multiple frequency bands. The frequency bands may be provided by a master node or secondary nodes that transmit over a 5G NR RAT utilizing various frequency bands.

In embodiments disclosed herein, a cell or wireless network may be provided by an access node. The access node may utilize one or more antennas to communicate with wireless devices or user equipment (UEs). Performance at a particular wireless device may be dependent on a number of factors including, for example, antenna performance parameters, network loading conditions, and wireless device location within a cell or a sector. Because certain network conditions are likely to result in poor performance of wireless devices in the network, embodiments provided herein perform a method for assigning wireless devices to a frequency band in a manner calculated to optimize wireless device performance throughout the network. The assignment of the wireless devices may be accomplished dynamically by a master node connected to one or more secondary nodes.

In embodiments set forth herein, assignment of wireless devices to a band is based on bandwidth. When the access node, processor, or processing node identifies a capable device, it may be programmed to assign wireless devices to a frequency band using a process that considers based on a ratio of the bandwidth of the frequency band to a total bandwidth of all available frequency bands for a particular RAT. In effect, connection requests are handled based on a ratio of each bandwidth for each available band for a given RAT to the total bandwidth available for the RAT, e.g., 5G NR. Wireless devices are dynamically distributed to each band based on the corresponding bandwidth and the corresponding ratio for the band. Embodiments described herein are particularly effective in high capacity areas, where a master access node transmitting over one RAT air interface may interact with multiple secondary nodes transmitting over a second RAT air interface. To achieve higher capacity, additional secondary nodes and/or additional frequency bands can be incorporated.

Therefore, in accordance with embodiments disclosed herein, methods and systems assign wireless devices to a frequency band for a particular RAT based on total available bandwidth for that RAT. Wireless devices will first be assigned to a first band with the largest bandwidth until a cap on the number of wireless devices that can be assigned to the first band is reached. The cap is based on the ratio of the bandwidth of the first band to the total available bandwidth for the RAT. Once the cap is reached, wireless devices are assigned to a second band with a second largest bandwidth until a second cap on the number of wireless devices that can be assigned to the second band is reached. The second cap is based on the ratio of the bandwidth of the second band to the total available bandwidth for the RAT. Once the cap is reached for the second band, the wireless devices are assigned to the third largest band until a third cap is reached, and so on, until all caps are reached. After all caps are reached, the method may again assign the wireless devices to the first and largest band and repeat the process. Using this process, a greater portion of available bandwidth for the RAT is utilized and thus overall network performance is improved.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNB or a gNB, and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNB and others may communicate with an NR gNB. Other wireless devices may interact with both an eNB and a gNB.

In addition to the systems and methods described herein, the operations of assigning wireless devices to frequency bands based may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary system 100 for use in conjunction with embodiments disclosed herein. System 100 comprises a communication network 101, gateway 102, controller node 104, access nodes 110 and 120, and wireless devices 131, 132, 133, and 134. Access node 110 is illustrated as having a coverage area 115 associated with a first frequency band F1 and a coverage area 116 associated with a second frequency band F2. Thus, access node 110 is configured to deploy radio air interfaces utilizing a first frequency band F1 and a second frequency band F2. In this exemplary embodiment, access node 110 deploys a radio air interface utilizing frequency band F1 over a coverage area 115 and a radio air interface utilizing frequency band F2 over a coverage area 116. F1 may be used for transmission over one RAT air interface and F2 may be used for transmission over another RAT air interface. Alternatively, both frequency bands may utilize the same RAT air interface. The frequency bands F1 and F2 may have pre-defined bandwidths.

Access node 120 is illustrated as having a coverage area 125 associated with frequency band F3 and a coverage area 126 associated with a frequency band F4. Thus, access node 120 deploys a radio air interface utilizing frequency band F3 over a coverage area 125 and a radio air interface utilizing frequency band F4 over a coverage area 126. F3 may be used for transmission over one RAT air interface and F4 may be used for transmission over another RAT air interface. Alternatively, both frequency bands may utilize the same RAT air interface. The frequency bands F3 and F4 may have predefined bandwidths. Further, additional frequency bands and channels may exist in the coverage areas of access nodes 110 and 120. In either case, each access node 110, 120 can deploy one or more radio air interfaces that utilize one or more frequency bands, enabling wireless communication with wireless devices 131, 132, 133, 134.

As shown herein, wireless devices 131, 132 attach to access node 110 via frequency bands F1 or F2. Similarly, wireless devices 133, 134 attach to access node 120 via frequency bands F3 or F4. Although access nodes 110, 120 and wireless devices 131, 132, 133, 134 are illustrated in FIG. 1, any number of access nodes and wireless devices can be implemented within system 100.

Wireless devices 131, 132, are located within coverage areas 115 and 116 and access network services from access node 110. Wireless device 133 and 134 are located within coverage areas 125 and 126 and access network services from access node 120. Further, wireless devices 132 and 133 are located within potential interference area 135 formed by an overlap of coverage areas 115, 116, 125, and 126.

Further, a scheduling entity (within, for example, one or both of access nodes 110, 120, or controller node 104) may be configured to allocate resources and provide mobility instructions by instructing wireless devices to connect to a particular frequency band.

Access nodes 110, 120 can be any network node configured to provide communication between wireless devices 131-134 and communication network 101, including standard access nodes and/or short range, low power, small access nodes. For instance, access nodes 110, 120 may include any standard access node, such as a macrocell access node, base transceiver station, a radio base station, gNBs in 5G networks, or eNBs in 4G/LTE networks, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131-134 may be any device, system, combination of devices, or other such communication platform capable of communicating wirelessly with access nodes 110, 120 using one or more frequency bands deployed therefrom. Wireless devices 131-134 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-134. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as LTE or 5G NR can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as predetermined noise thresholds and positions and characteristics of wireless devices 131-134. The database may further store channel information, scheduling schemes and resource allocations for each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
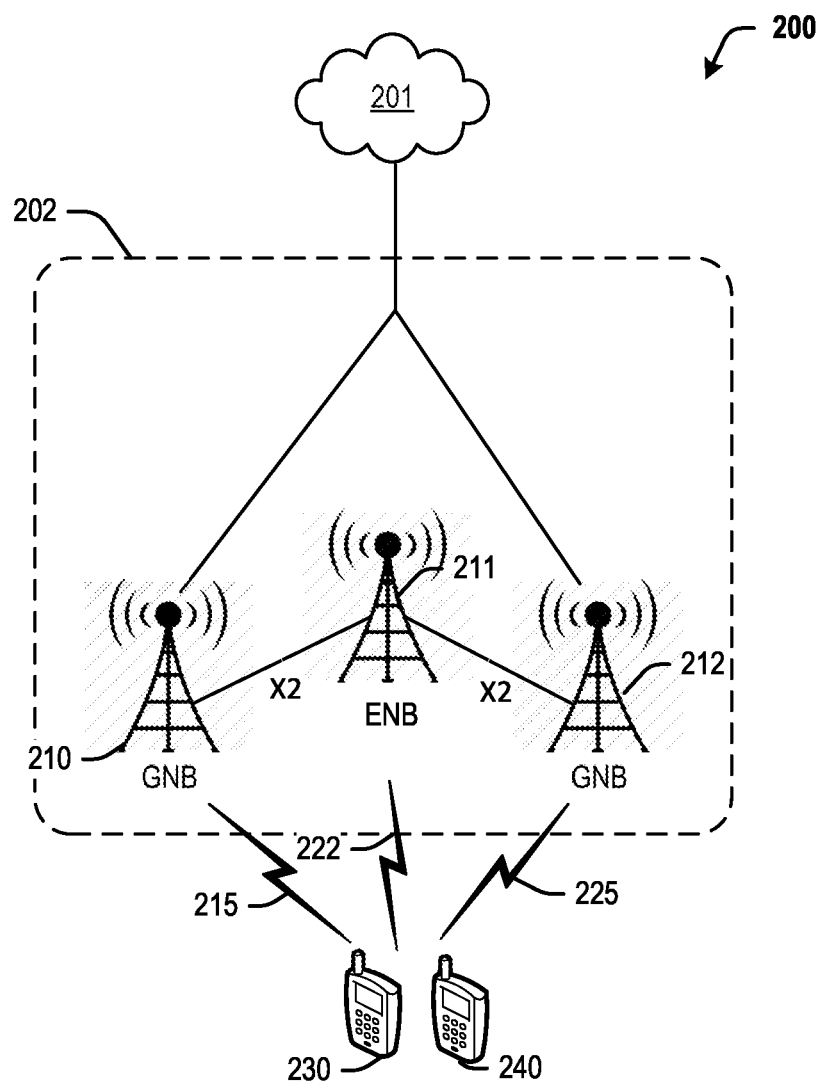
FIG. 2 illustrates an exemplary configuration of a 5G EN-DC radio access network.

FIG. 2 depicts an exemplary system 200 for E-UTRAN-NR Dual Connectivity (EN-DC) using 4G LTE and 5G NR. The access nodes 110 and 120 shown in FIG. 1 may utilize EN-DC using 4G LTE and 5G NR as shown. As shown in FIG. 1, the 4G LTE and 5G NR in a single node may be combined. System 200 includes a communication network 201, a radio access network 202, and wireless devices 230 and 240. Radio access network further includes at least access nodes 210, 211, and 212.

In embodiments as set forth herein, access nodes 110 and 120 shown in FIG. 1, may include all of nodes 210, 211, and 212 and may include additional nodes. Therefore, network 201 can include any combination of networks, including a core network, intermediate/backhaul network, or packet data network (PDN). Persons having ordinary skill in the art may note that although only access nodes 210, 211, and 212, and network 201 are illustrated in FIG. 2, other components such as gateways, controller nodes, user plane functions, etc. may be included as well.

In this exemplary embodiment, access node 210 can include a gNodeB, access node 211 can include an eNodeB, and access node 212 can include a gNodeB. In embodiments set forth herein, the access node 211 may be a master node and nodes 210 and 212 can operate as secondary nodes. In this one-to-many configuration, the eNodeB 211 is designated as the master node for wireless devices that can assign the wireless devices to the secondary nodes 210 and 212, which are illustrated as gNBs. For example, access node 211 deploys a first wireless air interface 222 using a first RAT, e.g., 4G LTE. Access node 210 can be configured to deploy a wireless interface 215 using a second RAT, e.g. 5G NR. Access node 212 deploys a wireless air interface 225, which can also utilize a 5G NR RAT. Each RAT can be configured to utilize one or more different frequency bands or sub-band, a different channel size or bandwidth, and so on. For example, the 5G NR wireless interfaces 215 and 225 can be configured to utilize higher frequencies and larger channel bandwidths than the 4G LTE wireless interface 215. Further, the wireless devices 230, 240 can be configured to communicate using both RATs at the same time. For example, dual connections can be set up with one or both of the wireless devices 230 and 240 using both 4G and 5G air interfaces respectively, the 4G wireless interface 222 being used to transmit control information, and one of the 5G wireless interfaces (e.g. 5G interface 215) being used to transmit data information.

For example, a processing node communicatively coupled to access node 211 can be configured to determine whether or not the wireless devices 230 and 240 are capable of communicating using both RATs (e.g. capable of 5G EN-DC). The processing node coupled to the access node 211 can further instruct the access node 211 to broadcast an indicator in, for example, a system information message. Responsive to the indicator, the wireless devices 230 and 240 can attach to access node 211 which can use the 4G carrier to control and set up a dual connectivity session with the wireless devices 230, 240. Further, access node 211 can function as a master node and be configured to perform methods described herein to select a frequency band for each wireless device requesting a connection. Further, access nodes 210 and 212 (hereinafter "secondary nodes") can each be coupled to access node 211 (hereinafter "master node") via X2 communication links.

Further, a processing node communicatively coupled to any of access nodes 210, 211, 212 can be configured to allocate air interface resources to wireless devices 230 and 240 by selecting an appropriate frequency band for connection of the wireless devices 230, 240.

Further, within radio access network 202, access nodes 210, 211, 212 can be coupled via a direct communication link 207, which can include an X2 communication link. Access nodes 210, 211, and 212 can communicate control and data information across X2 communication links. In an exemplary embodiment, access node 211 includes logic to determine how to allocate data packets between access node 211 and the secondary access nodes 210, 212, wherein the data packets flow between wireless devices 230 and 240 and a network node on network 201. Such logic may include a packet data convergence protocol (PDCP) function. Thus, RAN 202 can include a plurality of antenna elements (not shown herein) coupled to access nodes 210, 211, 212, with different antenna elements configured to deploy a different radio air interface using a different frequency. For example, each antenna element can be configured to deploy a 4G LTE air interface 222 or a 5G NR air interface 215, 225. Different quantities of antenna elements can be configured to deploy (or "assigned" to) a different type of air interface 215, 222, 225, depending on the needs of a network operator or users. Further, in split mode or "concurrent mode", individual antenna elements can be configured to simultaneously deploy at least two different air interfaces 215, 222, which enables wireless devices 230, 240 to transmit uplink data via two air interfaces selected from 215, 222, and 225 simultaneously. In an exemplary embodiment, the eNodeB portion 211 of RAN 202 is configured with logic to determine a transmission path for data packets traversing RAN 202. The transmission paths can traverse different RAT air interfaces 215, 222, 225. The one-to-many configuration illustrated in FIG. 2 allows a master node 211 to manage connections to multiple secondary nodes 210, 212.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 and/or RAN 202 may be, comprise, or include computers systems and/or processing nodes. This includes, but is not limited to: access nodes 110, 120, 210, 211, 212, controller node 104, and/or network 101.

Figure 3:
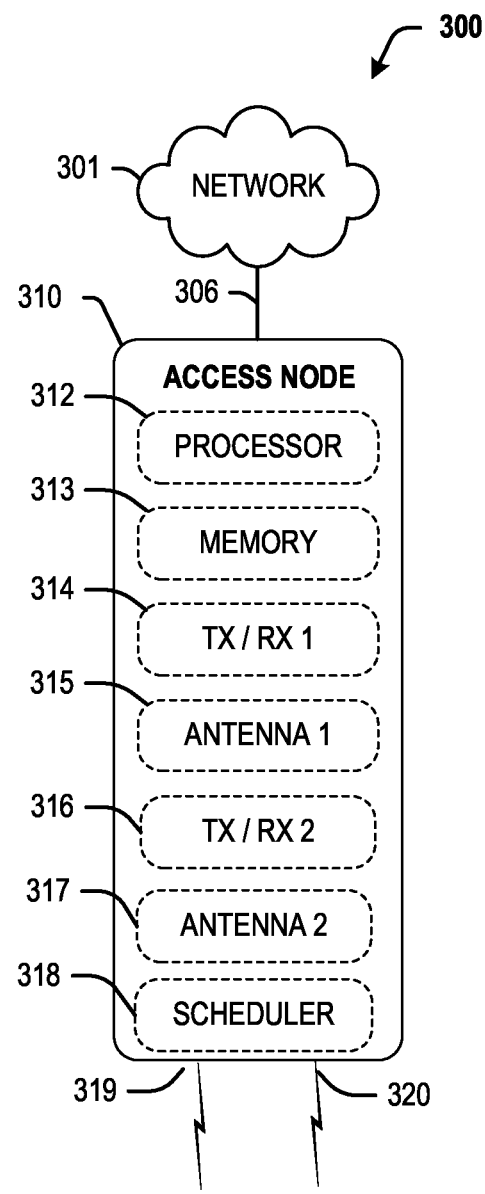
FIG. 3 depicts an access node in accordance with disclosed embodiments.

FIG. 3 depicts an exemplary access node 310. Access node 310 may comprise, for example, a macro-cell access node, such as access node 310 described with reference to FIG. 1. Access node 310 is illustrated as comprising a processor 312, memory 313, transceiver TX/RX 1 314, and antenna 1 315, transceiver TX/RX 2 316, antenna 2, 317, and scheduler 318. The first transceiver 314 and antenna 315 may be provided for deploying a radio air interface utilizing a first frequency band or first channel, and the second transceiver 316 and antenna 317 may deploy a radio air interface utilizing a second frequency band or second transmission channel. Two pairs of transceivers and antennae are illustrated herein solely to simplify the written description, and it may be evident to those having ordinary skill in the art, that any combination of transceivers and antennae may be incorporated in order to deploy carriers of multiple frequencies, formed beams, MU-MIMO data streams, and/or to facilitate communication with other network nodes on network 301. Processor 312 executes instructions stored on memory 313, while transceivers 314 and 316 and antennas 315 and 317 enable wireless communication with other network nodes, such as wireless devices and other nodes. For example, access node 310 may be configured to identify wireless device characteristics, determine a bandwidth of each frequency band, rank the frequency bands according to bandwidth, determine a ratio of bandwidth of each frequency band to a total bandwidth for a predetermined RAT, and assign the wireless devices to a frequency band based on these factors. Scheduler 318 may be provided for scheduling resources based on the presence of the wireless devices. These features may be enabled by access node 310 comprising two co-located cells, or antenna/transceiver combinations that are mounted on the same structure. Network 301 may be similar to network 101 discussed above. The wireless devices may operate in carrier aggregation mode, during which a wireless device utilizes more than one carrier, enabling the wireless devices to communicate with access node 310 using a combination of resources from multiple carriers.

Further, instructions stored on memory 313 can include instructions for dynamically assigning a wireless device to a frequency band, which will be further explained below with reference to FIGS. 4-7. The instructions may facilitate determining characteristics of a wireless device, determining bandwidth of each frequency band, determining a total bandwidth for a particular RAT, calculating a ratio of the bandwidth of each frequency band to the total bandwidth, ranking the frequency bands, determining a cap for each frequency band, and assigning the wireless devices to a frequency band based on these factors.

Figure 4:
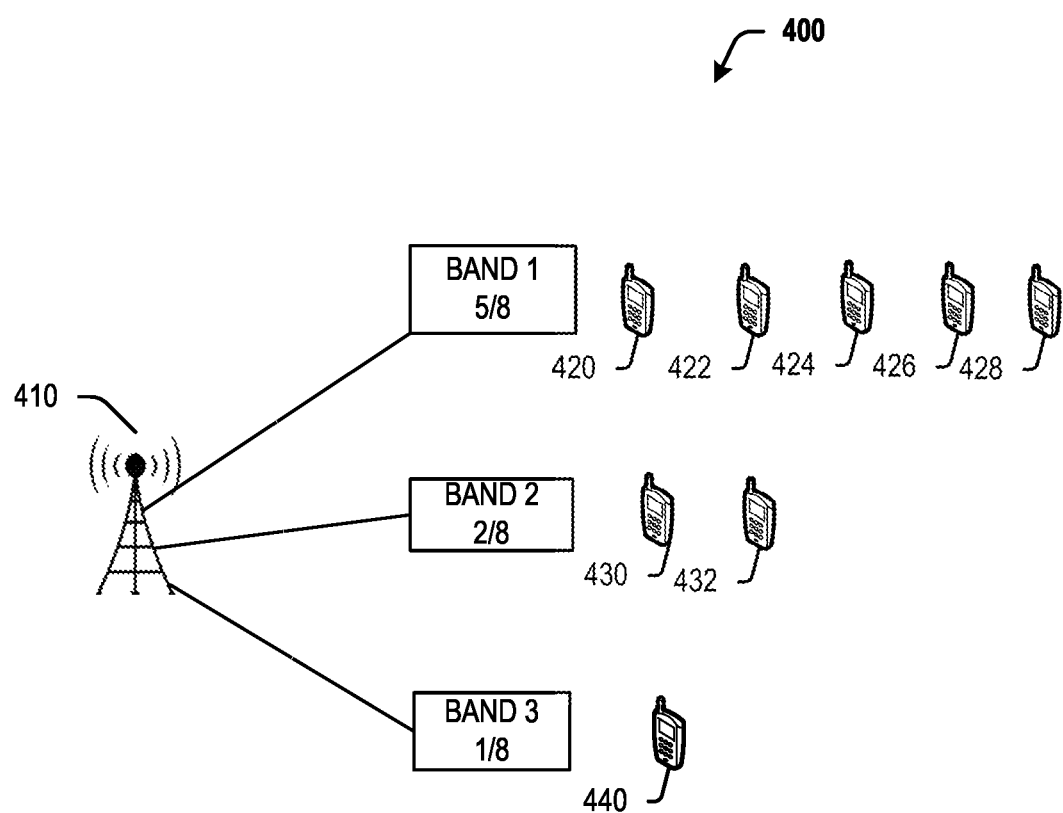
FIG. 4 depicts a band assignment scenario in accordance with the disclosed embodiments.

FIG. 4 depicts a band assignment scenario in accordance with disclosed embodiments. An access node 410, which may be any of the access nodes described above with reference to FIGS. 1-3, may assign wireless devices 420, 422, 424, 426, 428, 430, 432, and 440 to one of frequency bands 1, 2, and 3. In the displayed embodiment, the frequency bands 1-3 may for example, be 5G NR bands. Band 1 may have a bandwidth of 100 MHz, band 2 may have bandwidth of 40 MHz, and band 3 may have a bandwidth of 20 MHz. Thus, for the three bands utilizing 5G NR, the total bandwidth is 160 MHz. In accordance with embodiments disclosed herein, a ratio may be calculated for each band. Thus, a ratio for band 1 is equal to the bandwidth of band 1 divided by the total bandwidth, or 100/160, which is ⅝. The ratio for band 2 is equal to the bandwidth of band 2 divided by the total bandwidth or 40/160, which is ⅖. The ratio for band 3 is calculated by dividing the bandwidth of band 3 by the total 5G NR bandwidth or 20/160, which is ⅛.

In addition to calculating ratios, the access node 410 or a processor associated with the access node 410 ranks the bands. The bands are ranked based on their bandwidths, with the band with the highest bandwidth being ranked first. Furthermore, the access node 410 or a processor associated with the access node 410 determines a cap corresponding to each band, which will be equal to the number of devices that can be assigned to a band during a session. The cap may be calculated based on the above-described ratios.

In operation, when an initial connection request is received, the access node 410 assigns capable devices to the first ranked band, which is illustrated as Band 1. Based on the ratio ⅝ for the Band 1, the access node 410 sets a cap of five devices. Accordingly, the access node 410 may make the first five assignments of wireless devices 420, 422, 424, 426, and 428 to Band 1. Once five devices are assigned to Band 1, the access node 410 determines that the cap for Band 1 has been reached and begins assigning capable devices to Band 2. Because Band 2 has a cap of two devices based on its ⅖ ratio, the access node 410 assigns two wireless devices 430 and 432 to Band 2 and the cap is reached. Once the cap is reached the access node 410 assigns the next wireless device 440 to Band 3. Because the cap for Band 3 is one device, the access node 410 may continue by returning to Band 1 once the cap is reached for Band 3.

The numbers provided above are merely exemplary and the caps provided above may be altered to assign additional devices as long as the caps are proportional to the calculated ratios. For example, Band 1 might have a cap of ten devices, Band 2 may have a cap of four devices, and Band 3 may have a cap of two devices. Accordingly, the access node 410 provides a weighted round robin distribution pattern, by assigning devices sequentially to the bands, while maintaining assignments to correspond to calculated ratios.

While FIG. 4, is described in connection with access node 410, it should be noted that a processor may be provided in any access node 410 or may be included in controller node 104 and may be configured for controlling the access nodes. The processor may be configured for performing wireless device assignment by assigning wireless devices to a frequency band based on the order of connection requests, the band rankings, and the ratios described above. The assignment may occur dynamically in real time.

Figure 5:
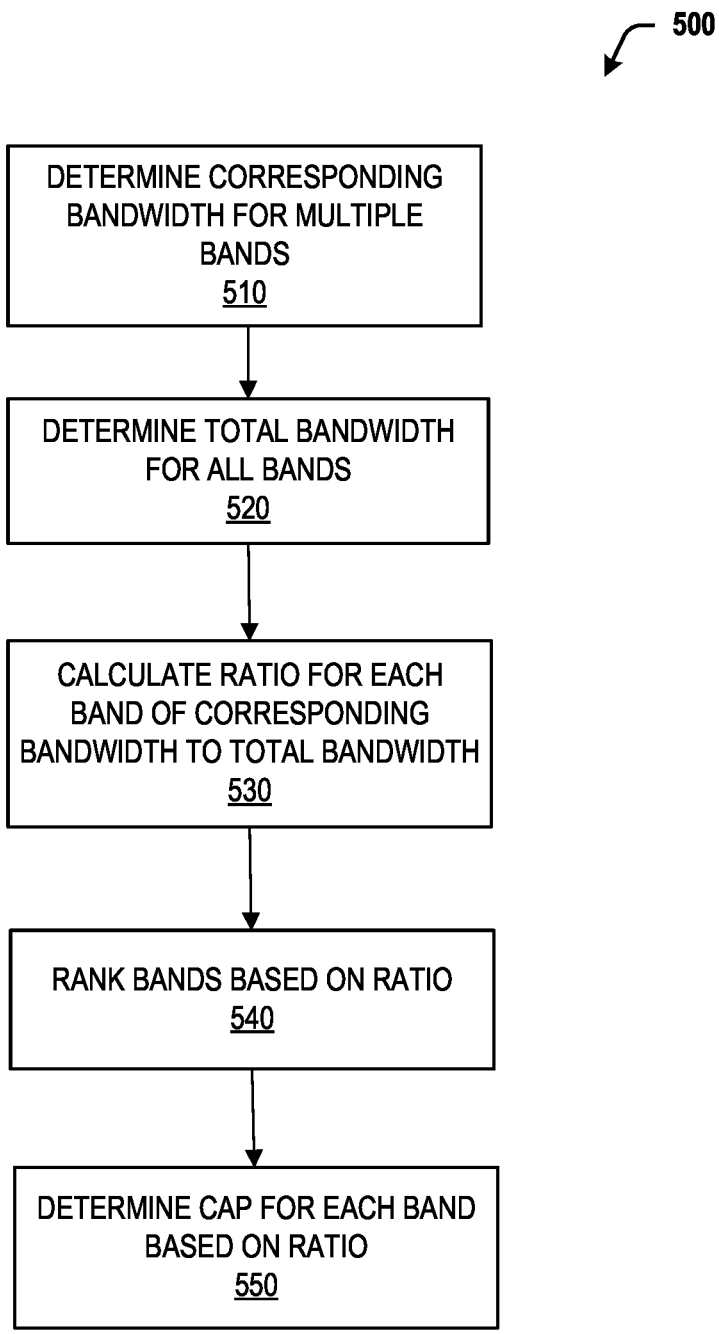
FIG. 5 depicts an exemplary method for frequency band assignment in accordance with disclosed embodiments.

The disclosed methods for assigning wireless devices to frequency bands based on band rankings and calculated ratios are further discussed with reference to FIG. 7. FIG. 5 illustrates an exemplary method 500 for assignment of wireless devices to frequency bands in accordance with disclosed embodiments. The steps illustrated in FIG. 5 may be performed by any suitable processor discussed herein, for example, a processor included in access node 110, 120, 210-212, or 310, or processor included in access node 410 or controller node 104. For discussion purposes, as an example, method 500 is described as being performed by a processor included in access node 410.

Method 500 starts in step 510 when the access node 410 determines a corresponding bandwidth for multiple bands utilized by a particular RAT. For example, the access node 410 may determine that a first 5G NR band has a bandwidth of 100 MHz, that a second 5G NR band has a bandwidth of 40 MHz, and that a third 5G NR band has a bandwidth of 20 MHz. In step 520, the access node 410 determines the total bandwidth for the particular RAT, which may be a 5G NR RAT. In the illustrated example, the total bandwidth is 160 MHz.

In step 530, the access node 410 calculates a ratio for each band of its corresponding bandwidth to the total bandwidth for the RAT. Thus, the access node 410 calculates a corresponding ratio of ⅝ for Band 1, ⅖ for Band 2, and ⅛ for Band 3. Further, in step 540, the access node 410 ranks the bands based on the bandwidth. The band having the largest bandwidth, which has the highest ratio, will be the first ranked band, and the band having the smallest bandwidth, which will also have the lowest ratio, is the last ranked band.

In step 550, the access node 410 determines a cap for each band based on the corresponding ratio. For example, with respect to the example in FIG. 4, the cap on band 1 may be five, the cap on Band 2 may be two and the cap on Band 3 may be one. Further, as long as the caps are set proportionately to the ratios, the caps may be higher. For example, the cap for Band 1 may be ten, the cap for Band 2 may be four, and the cap for Band 3 may be two. The caps correspond to the number for wireless devices that may be assigned to a band before moving to the next ranked band. In some instances, the caps may be limit by a spectral efficiency of a particular band. Spectral efficiency refers to the information rate that can be transmitted over a given bandwidth in a specific communication system. System spectral efficiency measures of the quantity of users or services that can be simultaneously supported by a limited radio frequency bandwidth in a defined geographic area. Thus, if the spectral efficiency of Band 1 indicates that only ten wireless devices can be supported, the cap would always be set at 10 wireless devices or fewer. The method as illustrated in FIG. 5 may be performed at intervals or in response to changes in a network.

Figure 6:
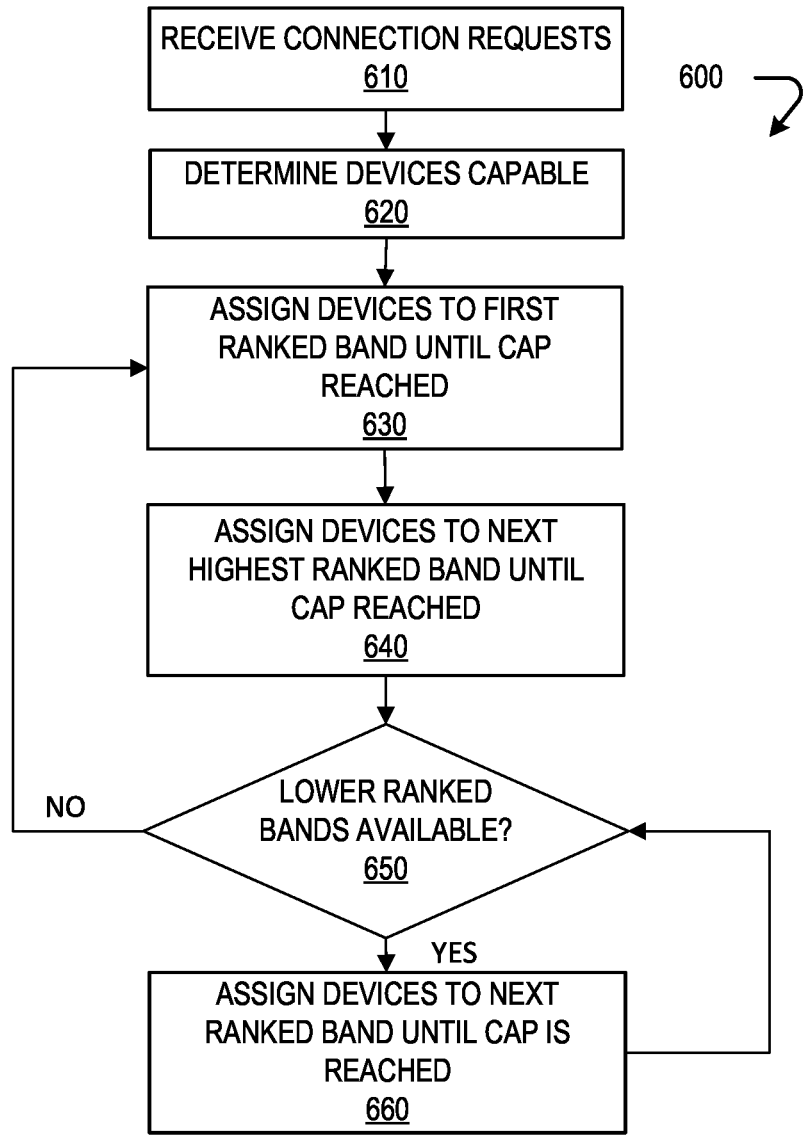
FIG. 6 depicts another exemplary method for assigning wireless devices to frequency bands in accordance with disclosed embodiments.

FIG. 6 illustrates a method for assigning wireless devices to a frequency band that may be performed dynamically. The method of FIG. 6 utilizes the ratios, rankings, and caps established in the method of FIG. 5. The steps illustrated in FIG. 6 may be performed by any suitable processor discussed herein, for example, a processor included in access node 110, 120, 210-212, 310, or 410 or processor included in controller node 104. For discussion purposes, as an example, method 600 is described as being performed by a processor included in access node 410.

In step 610, the access node 410 receives connection requests from wireless devices. In embodiments set forth herein, the access node 410 determines in step 620, upon receiving the connection requests, that the devices are capable of utilizing a 5G NR RAT, or other preferred RAT with multiple frequency bands. The determination may be made based on numerous methods including communications received at the access node 410 from the wireless device. For example, the wireless devices can use a UE CAPABILITY message to indicate (or report) capabilities of the wireless device to the access node 410. Alternatively, in another exemplary embodiment, wireless devices can be configured with a chipset type or version, which may be provided to the access node 410 by the wireless devices during an ATTACH PROCEDURE. Other methods of communicating whether the wireless device is capable of utilizing a particular RAT may be used in conjunction with the disclosed embodiments.

In step 630, the access node 410 assigns capable wireless devices to a first ranked band until the cap for the first ranked band is reached. The assignment of the wireless device to the selected frequency band may be accomplished, for example, by an instruction sent by the access node 410, to the wireless device for example by utilizing an RRC connection reconfiguration message or another message or indicator directed specifically to the wireless device.

In step 640, the access node 410 assigns wireless devices to the next highest ranked band until the cap on each band is reached. In step 650, the access node 410 determines whether lower ranked bands are available. If lower ranked bands are available in step 650, the access node 410 assigns devices to the next ranked band until the cap for the next ranked band is reached. The access node 410 repeats steps 650 and 660 until the wireless devices are all assigned or until no additional lower ranked bands are available. When no additional lower ranked bands are available in step 650, the access node 410 may return to assign devices to the first ranked band in step 630.

Figure 7:
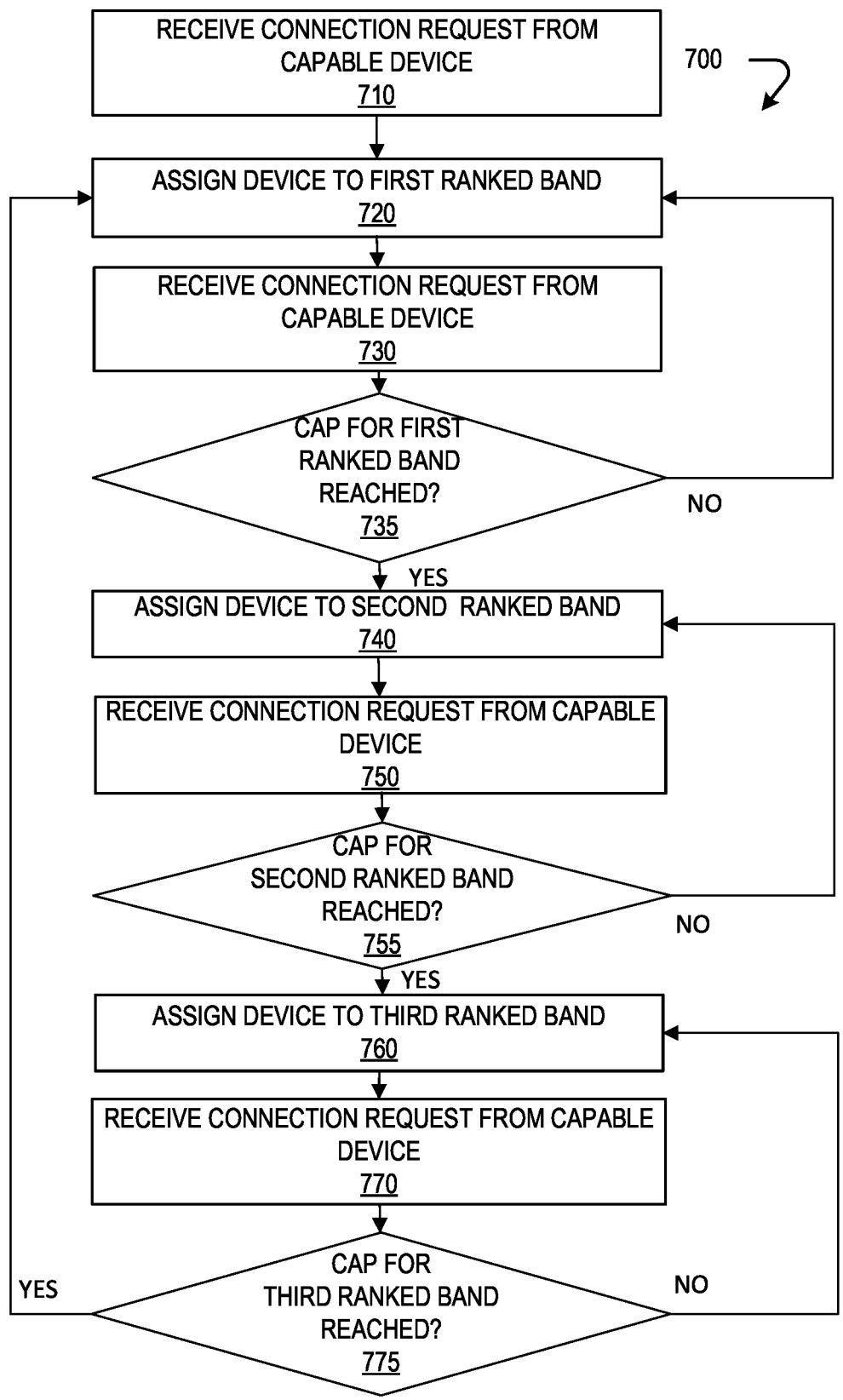
FIG. 7 depicts another exemplary method for assigning wireless devices to frequency bands in accordance with disclosed embodiments.

The method of FIG. 7 illustrates a method 700 for dynamic assignment of wireless devices to a frequency band in a scenario with three different frequency bands. Method 700 may be performed by any suitable processor discussed herein, for example, a processor included in access node 110, 120, 210-212, 310, or 410, or a processor included in controller node 104. For discussion purposes, as an example, method 700 is described as being performed by a processor included in access node 410.

In step 710, the access node 410 receives a connection request from a device capable of communicating using a particular RAT. As set forth above, the access node 410 may make the determination that the wireless device is capable based on one of several methods. For example, the access node 410 may make the determination based on a UE CAPABILITY message. Alternatively, in another exemplary embodiment, wireless devices can be configured with a chipset type or version, which may be provided to the access node 410 by the wireless devices during an ATTACH PROCEDURE. Other methods of communicating whether the wireless device is capable of utilizing a particular RAT may be used in conjunction with the disclosed embodiments.

In step 720, the access node 410 assigns the capable wireless device to the first ranked band. The assignment instruction may be sent by the access node 410 to the wireless device for example by utilizing an RRC connection reconfiguration message or another message directed specifically to the wireless device. In step 730, the access node 410 may receive a connection request from another capable wireless device. Before assigning the wireless device to a band, the access node 410 may determine whether the cap for the first ranked band has been reached in step 735. If the cap has not been reached in step 735, the access node 410 continues to assign devices to the first ranked band by returning to step 720.

However, if the cap is reached in step 735, the access node 410 assigns the capable wireless device to the second ranked band in step 740. Upon receiving another connection request from a capable wireless device in step 750, the access node 410 determines if the cap for the second ranked band has been reached in step 755. If the cap for the second ranked band has not been reached in step 755, the access node 410 returns to step 740 and continues to assign wireless devices to the second ranked band until the cap is reached in step 755.

When the cap is reached in step 755, the access node 410 assigns the capable wireless device to a third ranked band in step 760. In step 770, the access node 410 receives another connection request from a capable wireless device. If the cap for the third ranked band has not been reached in step 775, the access node 410 returns to step 760 and continues to assign wireless devices to the third ranked band until the cap is reached in step 775.

When the cap is reached in step 775, the access node 410 may return to step 720 to begin the assignment process with the first ranked band in accordance with the weighted round robin process disclosed herein.

In some embodiments, methods 500, 600, and 700 may include additional steps or operations. Furthermore, the methods may include steps shown in each of the other methods. As one of ordinary skill in the art would understand, the methods 500, 600, and 700 may be integrated in any useful manner. Additionally, in order to optimize a heterogeneous network, the methods disclosed may be performed for multiple devices in the network so that the wireless devices can be appropriately assigned.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
deploying multiple bands from a secondary node for a first radio access technology (RAT);
determining a corresponding bandwidth for each of multiple bands;
determining a total bandwidth for the multiple bands deployed for the first RAT;
calculating a corresponding ratio for each band of each corresponding bandwidth to the total bandwidth for the multiple bands;
ranking the bands based on the corresponding ratio;
receiving a connection request from a wireless device using a second RAT for connection to the first RAT; and
assigning the wireless device to one of the multiple bands for the first RAT based on the ranking.

2. The method of claim 1, further comprising receiving the connection request from the wireless device at a master node, the wireless device connecting to the master node using the second RAT.

3. The method of claim 2, wherein the master node is a long term evolution (LTE) master node operating in an evolved-universal mobile telecommunications service terrestrial radio access network (E-UTRAN) new radio—dual connectivity (EN-DC) environment.

4. The method of claim 2, wherein the first RAT is fifth generation (5G) new radio (NR).

5. The method of claim 3, wherein the wireless device is a new radio (NR) capable wireless device.

6. The method of claim 1, wherein a band having a highest bandwidth is ranked first and a band having a lowest bandwidth is ranked last and each other band is ranked sequentially based on the corresponding bandwidth.

7. The method of claim 6, further comprising imposing a corresponding cap for each band on a number of wireless devices assigned to the band based on the corresponding ratio for the band.

8. The method of claim 7, further comprising assigning each wireless device requesting a connection to the first ranked band until the corresponding cap for the first ranked band is reached.

9. The method of claim 8, further comprising assigning each wireless device requesting a connection to a second ranked band after the corresponding cap for the first ranked band is reached.

10. The method of claim 9, further comprising assigning each wireless device requesting a connection to a next ranked band after the corresponding cap for a previous band is reached.

11. An access node comprising:
at least one processor programmed for performing multiple operations, the operations including;
determining a corresponding bandwidth for each of multiple bands deployed by a secondary access node for a first RAT;
determining a total bandwidth for the first RAT;
calculating a corresponding ratio for each band of each corresponding bandwidth to the total bandwidth for the first RAT;
ranking the bands based on the corresponding ratio;
receiving a connection request from a wireless device at the access node wherein the connection request is for connection using the first RAT; and
assigning the wireless device to one of the multiple bands of the first RAT deployed by the secondary access node based on the ranking.

12. The access node of claim 11, wherein the access node is a long term evolution (LTE) master node operating in an evolved-universal mobile telecommunications service terrestrial radio access network (E-UTRAN) new radio-dual connectivity (EN-DC) environment.

13. The access node of claim 12, wherein the first RAT is fifth generation (5G) new radio (NR).

14. The access node of claim 11, wherein a band having a highest bandwidth is ranked first and a band having a lowest bandwidth is ranked last and each other band is ranked sequentially based on the corresponding bandwidth.

15. The access node of claim 14, the operations further comprising imposing a cap on a number of wireless devices assigned to each band based on the corresponding ratio for the band.

16. The access node of claim 15, the operations further comprising assigning each wireless device requesting a connection to the first ranked band until the cap for the first ranked band is reached.

17. The access node of claim 16, the operations further comprising assigning each wireless device requesting a connection to a next ranked band after the cap for a previous band is reached.

18. A method comprising:
determining a corresponding bandwidth for each of multiple bands deployed by an access node for a first RAT;
determining a total bandwidth for the multiple bands deployed for the first RAT; calculating a corresponding ratio for each band of each corresponding bandwidth to the total bandwidth for the multiple bands;
ranking each band deployed for the first RAT based on the corresponding bandwidth and imposing a corresponding cap for wireless devices connecting to each band based on the corresponding ratio; and
assigning wireless devices to a highest ranked band until the corresponding cap is reached.

19. The method of claim 18, wherein a band having a highest bandwidth is ranked first and a band having a lowest bandwidth is ranked last and each other band is ranked sequentially based on the corresponding bandwidth.

20. The method of claim 19, further comprising assigning wireless devices to a next ranked band until a cap for the next ranked band is reached.

* * * * *